(12) United States Patent
Zhang et al.

(10) Patent No.: US 9,813,707 B2
(45) Date of Patent: Nov. 7, 2017

(54) DATA PRUNING FOR VIDEO COMPRESSION USING EXAMPLE-BASED SUPER-RESOLUTION

(75) Inventors: Dong-Qing Zhang, Plainsboro, NJ (US); Sitaram Bhagavathy, Plainsboro, NJ (US); Joan Llach, Cesson Sevigne (FR)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 689 days.

(21) Appl. No.: 13/522,024

(22) PCT Filed: Jan. 21, 2011

(86) PCT No.: PCT/US2011/000117
§ 371 (c)(1),
(2), (4) Date: Jul. 13, 2012

(87) PCT Pub. No.: WO2011/090798
PCT Pub. Date: Jul. 28, 2011

(65) Prior Publication Data
US 2012/0288015 A1 Nov. 15, 2012

Related U.S. Application Data

(60) Provisional application No. 61/336,516, filed on Jan. 22, 2010.

(51) Int. Cl.
*H04N 7/12* (2006.01)
*H04N 19/105* (2014.01)
(Continued)

(52) U.S. Cl.
CPC ......... *H04N 19/105* (2014.11); *H04N 7/0125* (2013.01); *H04N 7/54* (2013.01);
(Continued)

(58) Field of Classification Search
CPC .. H04N 19/00896; H04N 19/59; H04N 19/94; H04N 19/00066; H04N 19/0009;
(Continued)

(56) References Cited

U.S. PATENT DOCUMENTS

| 5,446,806 A | 8/1995 | Ran et al. |
| 5,537,155 A | 7/1996 | O'Connell et al. |

(Continued)

FOREIGN PATENT DOCUMENTS

| CN | 1128097 | 7/1996 |
| CN | 1276946 | 12/2000 |

(Continued)

OTHER PUBLICATIONS

Barreto et al., "Region-Based Super-Resolution for Compression", Multidimensional Systems and Signal Processing, vol. 18, No. 2-3, Mar. 8, 2007, pp. 59-81.

(Continued)

*Primary Examiner* — Jorge L Ortiz Criado
*Assistant Examiner* — Yong Joon Kwon
(74) *Attorney, Agent, or Firm* — Brian J. Dorini; Ronald J. Kolczynski

(57) ABSTRACT

Methods and apparatuses for data pruning for video compression using example-based super resolution are provided. A method and apparatus for encoding is provided in which patches of video are extracted from input video, grouped together using a clustering method, and representative patches are packed into patch frames. The original video is downsized and sent either along with, or in addition to, the patch frames. At a decoder, the method and apparatus provided extract patches from the patch frames and create a patch library. The regular video frames are upsized and the low resolution patches are replaced by patches from the patch library by searching the library using the patches in the (Continued)

Exampled-based super-resolution for compression decoded regular frames as keywords. If there are no appropriate patches, no replacement is made. A post processing procedure is used to enhance the spatiotemporal smoothness of the recovered video.

40 Claims, 10 Drawing Sheets

(51) Int. Cl.

| | | |
|---|---|---|
| H04N 7/54 | (2006.01) | |
| H04N 19/146 | (2014.01) | |
| H04N 19/152 | (2014.01) | |
| H04N 19/149 | (2014.01) | |
| H04N 19/154 | (2014.01) | |
| H04N 7/01 | (2006.01) | |
| H04N 19/139 | (2014.01) | |
| H04N 19/46 | (2014.01) | |
| H04N 19/14 | (2014.01) | |
| H04N 19/94 | (2014.01) | |
| H04N 19/59 | (2014.01) | |

(52) U.S. Cl.
CPC ............ *H04N 19/139* (2014.11); *H04N 19/14* (2014.11); *H04N 19/146* (2014.11); *H04N 19/149* (2014.11); *H04N 19/152* (2014.11); *H04N 19/154* (2014.11); *H04N 19/46* (2014.11); *H04N 19/59* (2014.11); *H04N 19/94* (2014.11)

(58) Field of Classification Search
CPC ....... H04N 19/00096; H04N 19/00157; H04N 19/00181; H04N 19/00187; H04N 19/00278; H04N 19/00284; H04N 19/00424; H04N 19/00533; H04N 19/00593; H04N 19/00733; H04N 19/00757; H04N 19/00781; H04N 19/00884; H04N 19/0089; H04N 19/00903; H04N 19/00909; H04N 19/00963; H04N 19/105; H04N 19/139; H04N 19/14
USPC .................................................... 375/240.26
See application file for complete search history.

(56) References Cited

U.S. PATENT DOCUMENTS

| | | | |
|---|---|---|---|
| 5,557,684 A * | 9/1996 | Wang ................... G06K 9/38 348/E5.066 | |
| 5,754,236 A | 5/1998 | Lee | |
| 5,764,374 A | 6/1998 | Seroussi et al. | |
| 5,768,434 A | 6/1998 | Ran | |
| 5,784,491 A | 7/1998 | Koga | |
| 5,822,465 A | 10/1998 | Normile et al. | |
| 5,862,342 A | 1/1999 | Winter et al. | |
| 6,043,838 A | 3/2000 | Chen | |
| 6,173,089 B1 | 1/2001 | Van Lerberghe | |
| 6,278,446 B1 | 8/2001 | Liou et al. | |
| 6,397,166 B1 * | 5/2002 | Leung ................... G06K 9/6221 702/179 | |
| 6,526,183 B1 | 2/2003 | Bonnet et al. | |
| 6,795,578 B1 | 9/2004 | Kotani et al. | |
| 6,798,834 B1 | 9/2004 | Murakami et al. | |
| 7,386,049 B2 | 6/2008 | Garrido et al. | |
| 7,433,526 B2 | 10/2008 | Apostolopoulos et al. | |
| 7,447,337 B2 | 11/2008 | Zhang et al. | |
| 7,623,706 B1 | 11/2009 | Maurer | |
| 7,643,690 B2 | 1/2010 | Suzuki et al. | |
| 7,671,894 B2 | 3/2010 | Yea et al. | |
| 7,715,658 B2 | 5/2010 | Cho et al. | |
| 8,340,463 B1 * | 12/2012 | Cho ................... G06K 9/6297 382/162 | |
| 8,831,107 B2 | 9/2014 | Zheng et al. | |
| 9,031,130 B2 | 5/2015 | Suzuki et al. | |
| 2001/0055340 A1 | 12/2001 | Kim et al. | |
| 2002/0009230 A1 | 1/2002 | Sun et al. | |
| 2002/0036705 A1 * | 3/2002 | Lee et al. ................... 348/459 | |
| 2002/0172434 A1 | 11/2002 | Freeman et al. | |
| 2003/0005258 A1 | 1/2003 | Modha et al. | |
| 2003/0021343 A1 | 1/2003 | Trovato | |
| 2003/0058943 A1 | 3/2003 | Zakhor et al. | |
| 2004/0001705 A1 | 1/2004 | Soupliotis et al. | |
| 2004/0017852 A1 | 1/2004 | Garrido et al. | |
| 2004/0170330 A1 | 9/2004 | Fogg | |
| 2004/0213345 A1 | 10/2004 | Holcomb et al. | |
| 2004/0218834 A1 | 11/2004 | Bishop et al. | |
| 2004/0223662 A1 | 11/2004 | Urano et al. | |
| 2004/0258148 A1 | 12/2004 | Kerbiriou et al. | |
| 2005/0015259 A1 | 1/2005 | Thumpudi et al. | |
| 2005/0019000 A1 | 1/2005 | Lim et al. | |
| 2005/0225553 A1 | 10/2005 | Chi | |
| 2005/0243921 A1 * | 11/2005 | Au et al. ................... 375/240.12 | |
| 2006/0013303 A1 | 1/2006 | Nguyen et al. | |
| 2006/0039617 A1 | 2/2006 | Makai et al. | |
| 2006/0088191 A1 | 4/2006 | Zhang et al. | |
| 2006/0126960 A1 | 6/2006 | Zhou et al. | |
| 2006/0239345 A1 | 10/2006 | Taubman | |
| 2006/0245502 A1 | 11/2006 | Cheng et al. | |
| 2006/0269149 A1 * | 11/2006 | Song ................... 382/232 | |
| 2007/0014354 A1 | 1/2007 | Murakami et al. | |
| 2007/0031062 A1 | 2/2007 | Pal et al. | |
| 2007/0041663 A1 | 2/2007 | Cho et al. | |
| 2007/0118376 A1 * | 5/2007 | Mukerjee ............... G10L 15/063 704/245 | |
| 2007/0223808 A1 | 9/2007 | Kerr | |
| 2007/0223825 A1 | 9/2007 | Ye et al. | |
| 2007/0248272 A1 | 10/2007 | Sun et al. | |
| 2008/0107346 A1 | 5/2008 | Zhang et al. | |
| 2008/0117975 A1 | 5/2008 | Sasai et al. | |
| 2008/0131000 A1 * | 6/2008 | Tsai ................... G06K 9/348 382/182 | |
| 2008/0141304 A1 | 6/2008 | Otsu et al. | |
| 2008/0152243 A1 | 6/2008 | Min et al. | |
| 2008/0159401 A1 | 7/2008 | Lee et al. | |
| 2008/0172379 A1 * | 7/2008 | Uehara ............... G06F 17/30271 | |
| 2008/0187305 A1 | 8/2008 | Raskar et al. | |
| 2008/0285864 A1 | 11/2008 | Ishikawa | |
| 2009/0002379 A1 | 1/2009 | Baeza et al. | |
| 2009/0003443 A1 | 1/2009 | Guo et al. | |
| 2009/0041367 A1 | 2/2009 | Mansour | |
| 2009/0080804 A1 | 3/2009 | Hamada et al. | |
| 2009/0097564 A1 | 4/2009 | Chen et al. | |
| 2009/0097756 A1 * | 4/2009 | Kato ................... G06F 17/30256 382/190 | |
| 2009/0116759 A1 | 5/2009 | Suzuki et al. | |
| 2009/0175538 A1 | 7/2009 | Bronstein et al. | |
| 2009/0180538 A1 | 7/2009 | Visharam et al. | |
| 2009/0185747 A1 | 7/2009 | Segall et al. | |
| 2009/0196350 A1 | 8/2009 | Xiong | |
| 2009/0232215 A1 | 9/2009 | Park et al. | |
| 2009/0245587 A1 | 10/2009 | Holcomb et al. | |
| 2009/0252431 A1 | 10/2009 | Lu et al. | |
| 2009/0274377 A1 * | 11/2009 | Kweon ................... G06K 9/6272 382/225 | |
| 2010/0046845 A1 | 2/2010 | Wedi et al. | |
| 2010/0074549 A1 | 3/2010 | Zhang et al. | |
| 2010/0091846 A1 | 4/2010 | Suzuki et al. | |
| 2010/0104184 A1 | 4/2010 | Bronstein et al. | |
| 2010/0150394 A1 | 6/2010 | Bloom et al. | |
| 2010/0196721 A1 | 8/2010 | Ogawa | |
| 2010/0208814 A1 | 8/2010 | Xiong et al. | |
| 2010/0272184 A1 | 10/2010 | Fishbain et al. | |
| 2011/0007800 A1 | 1/2011 | Zheng et al. | |
| 2011/0047163 A1 | 2/2011 | Chechik et al. | |
| 2011/0142330 A1 | 6/2011 | Min et al. | |
| 2011/0170615 A1 | 7/2011 | Vo et al. | |
| 2011/0210960 A1 | 9/2011 | Touma et al. | |
| 2011/0261886 A1 | 10/2011 | Suzuki et al. | |
| 2012/0086850 A1 | 4/2012 | Irani et al. | |

(56) References Cited

U.S. PATENT DOCUMENTS

| | | | |
|---|---|---|---|
| 2012/0106862 A1 | 5/2012 | Sato | |
| 2012/0155766 A1 | 6/2012 | Zhang et al. | |
| 2012/0201475 A1* | 8/2012 | Carmel | H04N 19/172 382/238 |
| 2012/0320983 A1 | 12/2012 | Zheng et al. | |
| 2013/0078844 A1 | 3/2013 | Eusterholz et al. | |
| 2013/0163676 A1* | 6/2013 | Zhang | H04N 19/00587 375/240.25 |
| 2013/0163679 A1* | 6/2013 | Zhang | H04N 19/00133 375/240.26 |
| 2013/0170558 A1 | 7/2013 | Zhang | |
| 2013/0170746 A1 | 7/2013 | Zhang et al. | |
| 2014/0036054 A1* | 2/2014 | Zouridakis | 348/77 |
| 2014/0056518 A1* | 2/2014 | Yano | G06K 9/6267 382/173 |

FOREIGN PATENT DOCUMENTS

| | | |
|---|---|---|
| CN | 1495636 | 5/2004 |
| CN | 1777287 | 5/2006 |
| CN | 1863272 | 11/2006 |
| CN | 101048799 | 10/2007 |
| CN | 101198064 | 6/2008 |
| CN | 101389021 | 3/2009 |
| CN | 101459842 | 6/2009 |
| CN | 101556690 | 10/2009 |
| EP | 1401211 | 3/2004 |
| EP | 1659532 | 5/2006 |
| FR | 2941581 | 7/2010 |
| JP | 3027670 | 2/1991 |
| JP | 7222145 | 8/1995 |
| JP | 7231444 | 8/1995 |
| JP | 8502865 | 3/1996 |
| JP | 8336134 | 12/1996 |
| JP | 2000215318 | 8/2000 |
| JP | 2003018398 | 1/2003 |
| JP | 2004222218 | 8/2004 |
| JP | 2004266794 | 9/2004 |
| JP | 2004280633 | 10/2004 |
| JP | 200520761 | 1/2005 |
| JP | 2005303535 | 10/2005 |
| JP | 2005305535 | 11/2005 |
| JP | 2006203744 | 8/2006 |
| JP | 2006519533 | 8/2006 |
| JP | 2008148119 | 6/2008 |
| JP | 2008278042 | 11/2008 |
| JP | 2008289005 | 11/2008 |
| JP | 200977189 | 4/2009 |
| JP | 2009267710 | 11/2009 |
| JP | 2010514325 | 4/2010 |
| JP | 2011501542 | 1/2011 |
| JP | 2013528309 | 7/2013 |
| KR | 0169662 | 10/1998 |
| KR | 1020060121535 | 11/2006 |
| WO | WO9406099 | 3/1994 |
| WO | WO9819450 | 5/1998 |
| WO | WO9933273 | 7/1999 |
| WO | WO03084238 | 10/2003 |
| WO | WO03102868 | 12/2003 |
| WO | WO2005043882 | 5/2005 |
| WO | WO2006025339 | 3/2006 |
| WO | WO2007111966 | 10/2007 |
| WO | WO2008066025 | 6/2008 |
| WO | WO2009052742 | 4/2009 |
| WO | WO2009087641 | 7/2009 |
| WO | WO2009094036 | 7/2009 |
| WO | WO2009157904 | 12/2009 |
| WO | WO2010033151 | 3/2010 |
| WO | WO2011090798 | 7/2011 |
| WO | WO2012033967 | 3/2012 |

OTHER PUBLICATIONS

Bishop et al., "Super-Resolution Enhancement of Video", Proceedings of the 9th Conference on Artificial Intelligence and Statistics (AISTATS 2003), Jan. 3, 2003, 8 pages.

Freeman et al., "Example-Based Super-Resolution", IEEE Computer Graphics and Applications, vol. 22, No. 2, Mar. 1, 2002, pp. 56-65.
Li et al., "Example-Based Image Super-Resolution with Class-Specific Predictors", Journal of Visual Communication and Image Representation, vol. 20, No. 5, Jul. 1, 2009, pp. 312-322.
Search report dated Apr. 29, 2011.
International Search Report for Corresponding Appln. PCT/US2011/000107 dated Apr. 20, 2011.
International Search Report for Corresponding Appln. PCT/US2011/000117 dated Apr. 29, 2011.
International Search Report for Corresponding Appln. PCT/US2011/050913 dated Jul. 30, 2012.
International Search Report for Corresponding Appln. PCT/US2011/050917 dated Jan. 5, 2012.
International Search Report for Corresponding Appln. PCT/US2011/050919 dated Jan. 4, 2012.
US Notice of Allowance for Corresponding U.S. Appl. No. 13/574,428 dated Jul. 16, 2015.
US Office Action for Related U.S. Appl. No. 13/821,078 Dated Jun. 5, 2015.
US Office Action for Related U.S. Appl. No. 13/821,436 Dated Jun. 18, 2015.
US Office Action for Related U.S. Appl. No. 13/820,901 Dated May 5, 2015.
US Office Action for Related U.S. Appl. No. 13/821,130 Dated Jun. 16, 2015.
US Office Action for Related U.S. Appl. No. 13/821,393 Dated Jul. 10, 2015.
US Non-Final Office Action for related U.S. Appl. No. 13/821,270 dated Jul. 16, 2015.
US Non-Final Office Action for related U.S. Appl. No. 13/821,393 dated Jul. 10, 2015.
US Non-Final US Office Action for related U.S. Appl. No. 13/821,357 dated Aug. 13, 2015.
US Non-Final Office Action for related U.S. Appl. No. 13/821,257 dated Aug. 19, 2015.
US Non-Final Office Action for related U.S. Appl. No. 13/821,283 dated Aug. 17, 2015.
US Non-Final Office Action for related U.S. Appl. No. 13/821,083 dated Jul. 16, 2015.
US Notice of Allowance for related U.S. Appl. No. 13/821,424 dated Jan. 15, 2015.
Symes, "Digital Video Compression," McGraw-Hill, 2004, ISBN 0-07-142487, pp. 116-121 and 242-243.
China Search Report for Related CN Application No. 2011800435953 Dated Aug. 18, 2015.
CN Search Report for Related CN Application No. 2011800432758 dated Sep. 23, 2015 CN version.
CN Search Report for Related CN Application No. 201180006921.3 dated Oct. 10, 2014.
CN Search Report for Related CN Application No. 2011800153355 dated Nov. 22, 2014.
CN Search Report for Related CN Application 2011800437234 dated Sep. 16, 2015.
CN Search Report for Related Cn Application 201180054419X dated Sep. 8, 2015 CN version.
CN Search Report for Related CN Application 2011800432940 dated Jul. 28, 2015 CN version.
CN Search Report for Related CN Application 201180053976.X dated Sep. 23, 2015.
Ben-Ezra et al., "Video Super-Resolution Using Controlled Subpixel Detector Shifts", IEEE Transactions on Pattern Analysis and Machine Intelligence, vol. 27, No. 6, Jun. 2005, pp. 977-987.
Itu-T H.264 Standard, "Advanced Video Coding for Generic Audiovisual Services", International Telecommunication Union, Mar. 2005, 343 pages.
Ndjiki-Nya et al., "A Generic and Automatic Content-Based Approach for Improved H.264/MPEG4-AVC Video Coding", IEEE International Conference on Image Processing (ICIP), 2005, 4 pages.

(56) References Cited

OTHER PUBLICATIONS

Sawhney et al., Hybrid Stereo Camera: An IBR Approach for Synthesis of Very High Resolution Stereoscopic Image Sequences, Proc. Siggraph, 2001, pp. 451-460.
Katsaggelos et al., "High-Resolution Images from Low-Resolution Compressed Video", IEEE Signal Processing Magazine, vol. 20, No. 3, May 1, 2003, pp. 37-48.
Lee et al., "Robust Frame Synchronization for Low Signal-to-Noise Ratio Channels Using Energy-Corrected Differential Correlation", Eurasip Journal on Wireless Communications and Networking, vol. 2009 (2009), Article ID 345989.
Cheng et al., "Reduced Resolution Residual Coding for H.264-based Compression System," Proceedings of the 2006 IEEE Int'l. Symposium on Circuits and Systems (ISCAS 2006), May 21, 2006, pp. 3486-3489.
Moffat et al., "Chapter 3. Static Codes," Compression and Coding Algorithms, Jan. 2002, pp. 29-50.
Zhang et al, "A Pattern-based Lossy Compression Scheme for Document Images," Electronic Publishing, vol. 8, No. 2-3, Sep. 24, 1995, pp. 221-233.
Black et al., "The Robust Estimation of Multiple Motions: Parametric and Piecewise-Smooth Flow Fields," computer Vision and Image Understanding, vol. 63, No. 1, Jan. 1996, pp. 75-104, Academic Press, Orlando, FL, USA.
Fischler et al., "Random Sample Consensus: a Paradigm for Model Fitting with Applications to Image Analysis and Automated Cartography," Communications of the ACM, vol. 24, No. 6, Jun. 1981, pp. 381-395, Acm Press, \NY, NY, USA.
Park et al., "Super-Resolution Image Reconstruction: A Technical Overview," IEEE Signal Processing Magazine, vol. 20, No. 3, May 2003, pp. 21-36.
Torr et al., "MLESAC: A New Robust Estimator with Application to Estimating Image Geometry," Computer Vision and Image Understanding, vol. 78, No. 1, Apr. 2000, pp. 138-156, Academic Press, Orlando, FL, USA.
Bertalmio et al., "Image Inpainting", Proceedings of Siggraph 2000, New Orleans, USA, Jul. 2000, pp. 1-8.
Bhagavathy et al., "A Data Pruning Approach for Video Compression Using Motion-Guided Down-Sampling and Super-Resolution", submitted to ICIP 2010, pp. 1-4.
Torr et al., "Clustering Sequences by Overlap", International Journal Data Mining and Bioinformatics, vol. 3, No. 3, 2009, pp. 260-279.
Dumitras et al., "An Encoder-Decoder Texture Replacement Method with Application to Content-Based Movie Coding", IEEE Transactions on Circuits and Systems for Video Technology, vol. 14, No. 6, Jun. 2004, pp. 825-840.
Dumitras et al., "A Texture Replacement Method at the Encoder for Bit-Rate Reduction of Compressed Video", IEEE Transactions on Circuits and Systems for Video Technology, vol. 13, No. 2, Feb. 2003, pp. 163-175.
Han et al., "Rank-based Image Transformation for Entropy Coding Efficiently", Proceedings of the Fourth Annual ACIS International Conference on Computer and Information Science (ICIS'05), IEEE 2005.
Zhang et al., "Example-Based Data Pruning for Improving Video Compression Efficiency", Invention Disclosure, Apr. 2010.
Zhang et al., "Video Decoding Using Blocked-Based Mixed-Resolution", Information on Invention Disclosure, Mar. 2010, published as W012033967 and US20130170558.
Komodakis et al., "Image Completion Using Efficient Belief Propagation Via Priority Scheduling and Dynamic Pruning", IEEE Transactions on Image Processing, vol. 16, No. 11, Nov. 1, 2007, pp. 2649-2661.
Krutz et al., Windowed Image Registration for Robust Mosaicing of Scenes with Large Background Occlusions, ICIP 2006, vol. 1-7, IEEE, 2006, pp. 353-356.
Liu et al., "Intra Prediction via Edge-Based Inpainting", IEEE 2008 Data Compression Conference, Mar. 25-27, 2008, pp. 282-291.
Lowe, "Distinctive Image Features from Scale-Invariant Keypoints", International Journal of Comoputer Vision, vol. 2, No. 60, 2004, pp. 1-28.
Porikli et al., "Compressed Domain Video Object Segmentation", IEEE Transactions on Circuits and Systems for Video Technology, vol. 20, No. 1, Jan. 2010, pp. 1-14.
Schuster et al., "An Optimal Polygonal Boundary Encoding Scheme in the Rate Distortion Sense", IEEE Transactions on Image Processing, vol. 7, No. 1, Jan. 1998, pp. 13-26.
Sermadevi et al., "Efficient Bit Allocation for Dependent Video Coding", Proceedings of the Data Compression conference (Dcc'04), IEEE, 2004.
Shen et al., "Optimal Pruning Quad-Tree Block-Based Binary Shape Coding", IEEE Proceedings 2007, International conference on Image Processing, Icip, 2007, pp. V1-437-V1-440.
Smolic et al., "Improved Video Coding Using Long-term Global Motion Compensation", Visual Communications and Image Processing, Jan. 20, 2004, pp. 343-354.
Sun et al., "Classified Patch Learning for Spatially Scalable Video Coding", Proceedings of the 16th IEEE ntemational Conference on Image Processing, Nov. 7, 2009, pp. 2301-2304.
Vo et al., "Data Pruning-Based Compression Using High Order Edge-Directed Interpolation", IEEE Conference on Acoustics, Speech and Signal Processing, Taiwan Roc, 2009, pp. 997-1000.
Vu et al., "Efficient Pruning Schemes for Distance-Based Outlier Detection", Springer Verlag, Proceedings European conference 2009, pp. 160-175.
Wiegand et al., "Overview of the H.264/AVC Video Coding Standard", IEEE Transactions on Circuits and Systems for Video Technology, vol. 13, No. 7, Jul. 2003, pp. 560-576.
Wu et al., Image Compression by Visual Pattern Vector Quantization (VPVQ), Proceedings of the 2008 Data Compression Conference, Mar. 25, 2008, pp. 123-131.
Xiong et al., "Block-Based Image Compression with Parameter-Assistant Inpainting", IEEE Transactions on Image Processing, vol. 19, No. 6, Jun. 2010, pp. 1651-1657.
Xu et al., Probability Updating-based Adaptive Hybrid Coding (PUAHC), ISCAS 2006, IEEE 2006, pp. 361-364.
Yap et al., "Unsupervised Texture Segmentation Using Dominant Image Modulations", IEEE Conference Recordings of the 34th Asilomar Conference on Signals, Systems and Computers, IEEE 2000, pp. 911-915.
Zhang et al., "Segmentation for Extended Target in Complex Backgrounds Based on Clustering and Fractal", Optics and Precision Engineering, vol. 17, No. 7, Jul. 2009, pp. 1665-1671. (English Translation to Follow).
Zheng et al., "Intra Prediction Using Template Matching with Adaptive Illumination Compensation", ICIP 2008, IEEE 2008, pp. 125-128.
Zhu et al, "Video Coding with Spatio-Temporal Texture Synthesis", Proceedings of the 2007 IEEE International Conference on Multimedia and Expo, Jul. 1, 2007, pp. 112-115.
International Search Report for Corresponding International Appln. PCT/US2011/050921 dated Jan. 4, 2012.
International Search Report for Corresponding International Appln. PCT/US2011/050923 dated Jan. 5, 2012.
International Search Report for Corresponding Appln. PCT/US2011/050925 dated Jan. 6, 2012.
International Search Report for Corresponding Appln. PCT/US2011/050915 dated Jul. 30, 2012.
International Search Report for Corresponding International Appln. PCT/US2011/050918 dated Jan. 5, 2012.
International Search Report for Corresponding International Appln. PCT/US2011/050920 dated Jan. 4, 2012.
International Search Report for Corresponding Appln. PCT/US2011/050922 dated Jan. 4, 2012.
International Search Report for International Application PCT/US11/050924 dated Jan. 5, 2012.
CN Search report for Related CN Application No. 201180054405.8 dated Nov. 30, 2015.
CN Search Report for Related CN Application 201180054419X dated Sep. 8, 2015.

(56) References Cited

OTHER PUBLICATIONS

US Notice of Allowance of Allowance for U.S. Appl. No. 13/522,024 dated Mar. 14, 2016.
US Notice of Allowance of Allowance for U.S. Appl. No. 13/821,424 dated Mar. 14, 2016.
Shimauchi Kazuhiro, "JPEG Based Image Compression Using Adaptive Multi Resolution Conversion," The 17th Workshop on Circuits and Systems in Karuizawa, The Institute of Electronics, Information and Communication Engineers, Apr. 27, 2004, pp. 147-152.
Notice of Allowance for U.S. Appl. No. 13/821,393 Dated Mar. 18, 2016.
US Non-Final Office Action for U.S. Appl. No. 13/821,130 Dated Jul. 11, 2016.
US Non-Final Office Action for U.S. Appl. No. 13/821,436 Dated Jul. 11, 2016.
US Final Office for U.S. Appl. No. 13/821,270 Dated Feb. 26, 2016.
US Non-Final Office Action for U.S. Appl. No. 13/820,901 Dated May 18, 2016.

* cited by examiner

Exampled-based super-resolution for compression

DATA PRUNING FOR VIDEO COMPRESSION USING EXAMPLE-BASED SUPER-RESOLUTION

CROSS-REFERENCE TO RELATED APPLICATIONS

This application is a National Stage Application and claims the benefit, under 35 U.S.C. §365 of International Application PCT/US2011/000117 filed Jan. 21, 2011 which was published in accordance with PCT Article 21(2) on Jul. 28, 2011 in English, and which claims the benefit of U.S. Provisional Patent Application No. 61/336,516 filed on Jan. 22, 2010.

FIELD OF THE INVENTION

The present principles relate to an apparatus and method for efficient video compression by using data pruning as a video preprocessing technique to achieve better video coding efficiency through removal of part of the input video data before it is encoded.

BACKGROUND OF THE INVENTION

Data pruning for video compression is an emerging technology in the area of video compression. There has been some prior work on data pruning to improve video coding efficiency.

One approach is vertical and horizontal line removal as in D. T. Vo, J. Sole, P. Yin, C. Gomila, and T. Nguyen, "Data Pruning-Based Compression Using High Order Edge-Directed Interpolation", Thomson Research technical report, submitted to the *IEEE International Conference on Acoustics, Speech, and Signal Processing (ICASSP)*, 2009. This approach removes vertical and horizontal lines in video frames before encoding, and recovers the lines by non-linear interpolation after decoding. The positions of the lines are optimized to minimize the recovery error. There are a number of drawbacks to this approach. First, the positions of the lines have to be sent though a side channel and losslessly encoded, which could decrease overall coding efficiency. Second, the removal of lines may result in loss of information, leading to aliasing artifacts during recovery. For example, if there is a one-pixel horizontal line in the video frame, it may be lost due to line removal and not recoverable at the decoder side. Third, in a video shot, the line positions have to be the same for all frames in the shot. If there is fast motion in the shot, it may result in false removal of the lines containing important information. Although line removal can be designed to adapt to object motion in a shot, removing different lines in different frames in a shot may create artificial motion, therefore it could adversely affect the video coding process that involves motion estimation and motion compensation.

Another category of approaches is based on block or region removal, such as in P. Ndjiki-Nya, T. Hinz, A. Smolic, and T. Wiegand, "A generic and automatic content-based approach for improved H.264/MPEG4-AVC video coding," *IEEE International Conference on Image Processing (ICIP)*, 2005; Chunbo Zhu, Xiaoyan Sun, Feng Wu, and Houqiang Li, "Video Coding with Spatio-Temporal Texture Synthesis," *IEEE International Conference on Multimedia and Expo (ICME)*, 2007; and Chunbo Zhu, Xiaoyan Sun, Feng Wu, and Houqiang Li, "Video coding with spatio-temporal texture synthesis and edge-based inpainting," *IEEE International Conference on Multimedia and Expo (ICME)*, 2008. These approaches are similar to line removal except that blocks or regions are removed instead of lines. The removed blocks or regions are recovered at the decoder side by interpolation or inpainting. The drawbacks of these approaches are similar to those of line removal. However, using blocks rather than lines may gain more flexibility for data pruning, therefore alleviating the problem of information loss, but other problems are the same as those of the line removal approach.

Image or video epitome, such as in N. Jojic, B. Frey, and A. Kannan, "Epitomic analysis of appearance and shape," *IEEE International Conference on Computer Vision (ICCV)*, 2003, and V. Cheung, B. Frey, and N. Jojic, "Video epitomes," *IEEE Computer Society Conference on Computer Vision and Pattern Recognition (CVPR)*, 2005 is another technique that could potentially be used for data pruning for compression. Epitome based approaches divide an image (or video) into patches, and represent an image as a small miniature containing representative patches and a surjective map that maps the patches in the image to those in the epitome miniature. The small miniature (i.e. epitome) can be deemed as a compressed version of the original image or video, therefore epitome can potentially be used for compression purposes. However, the problem of applying epitome to data pruning is that the surjective map also has to be sent to a decoder as side information. Furthermore, the surjective map has to be losslessly encoded to avoid correspondence error and artifacts, which could substantially reduce encoding efficiency.

SUMMARY OF THE INVENTION

The present principles are directed to a method and apparatus for data pruning for video compression using example based super resolution.

According to one aspect of the present principles, there is provided a method for video processing using data pruning for video compression. The method is comprised of extracting patches, or portions, of video from a received video signal, clustering the patches into groups, and packing representative patches from the groups into patch frames, and transmitting to a decoder.

According to another aspect of the present principles, there is provided an apparatus for video processing using data pruning for video compression. The apparatus is comprised of a means for extracting patches of video from a video signal and clustering the patches into groups and circuitry that packs representative patches from the groups into patch frames and circuitry that transmits the data to an encoder.

According to another aspect of the present principles, there is provided an apparatus for video processing using data pruning for video compression. The apparatus is comprised of a patch extracter and clusterer that extracts patches of video from a video signal and clusters the patches into groups and circuitry that packs representative patches from the groups into patch frames and circuitry that transmits the data to an encoder.

According to another aspect of the present principles, there is provided a method for video processing, comprising extracting patches of video from patch frames, creating a patch library from the patches, increasing the size of regular frames of video, replacing the low resolution portions of video in the regular frames with patches searched from the patch library using the low resolution portions as keywords and performing post processing on the resulting video.

According to another aspect of the present principles, there is provided an apparatus for video decoding, comprising means for extracting patches from the patch frames and creating a patch library, resizing circuitry that increases the size of regular frames of video, patch search circuitry that searches the patch library using low resolution portions of video in the regular frames as keywords, patch replacement circuitry for replacing the low resolution portions with the patches searched from the patch library, and a post processor that performs post processing on video from the patch replacement circuitry.

According to another aspect of the present principles, there is provided an apparatus for video decoding, comprising a patch extracter processor that extracts patches from the patch frames and creates a patch library, resizing circuitry that increases the size of regular frames of video, patch search circuitry that searches the patch library using low resolution portions of video in the regular frames as keywords, patch replacement circuitry for replacing the low resolution portions with the patches searched from the patch library, and a post processor that performs post processing on video from the patch replacement circuitry.

These and other aspects, features and advantages of the present principles will become apparent from the following detailed description of exemplary embodiments, which is to be read in connection with the accompanying drawings.

DETAILED DESCRIPTION

Figure 1A:
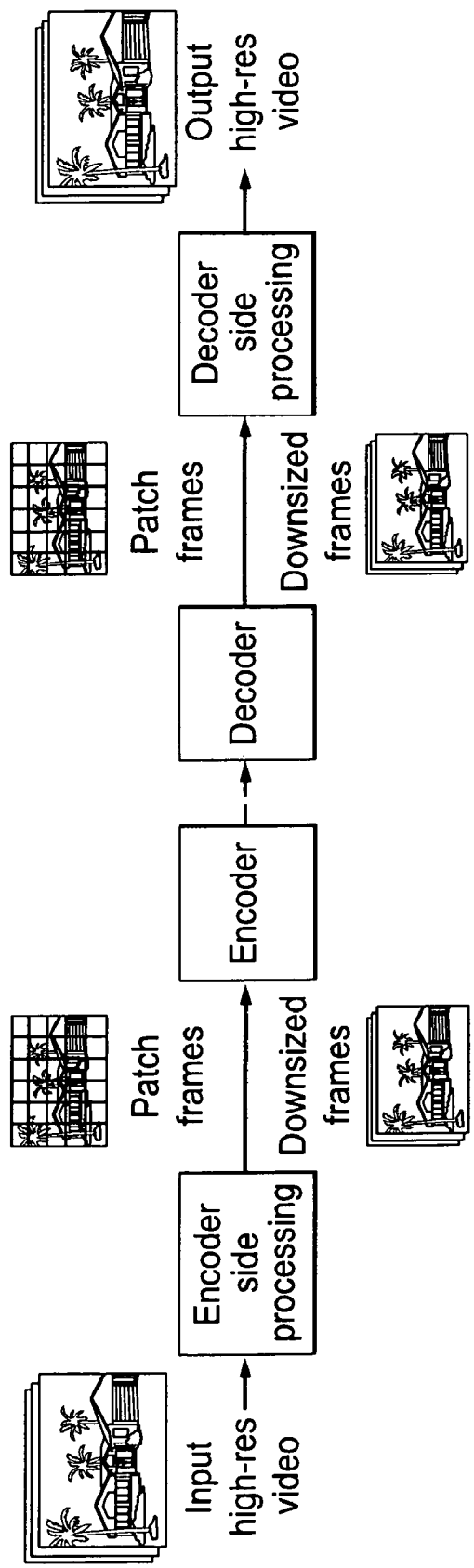
FIG. 1 shows a system diagram of the example-based super resolution approach under the present principles.

The principles presented herein provide a novel data pruning framework using example-based super-resolution. Data pruning is a video preprocessing technique to achieve better video coding efficiency by removing part of the input video data before it is encoded. The removed video data is recovered at the decoder side by inferring this removed data from the decoded data. One example of data pruning is image line removal, which removes some of the horizontal and vertical scan lines in the input video.

Example-based super-resolution is a super-resolution technique that converts a low-resolution (low-res) image into high-resolution (high-res) image by finding high-res patches in a patch library using low-res patches in the input image as query keywords, and replacing low-res patches in the low-res input image with the retrieved high-res patches. In other words, the low-res patches act like indices into the patch library to retrieve a corresponding high-res patch. Example-based super-resolution was first proposed in William T. Freeman, Thouis R. Jones, and Egon C. Pasztor, "Example-based super-resolution", IEEE Computer Graphics and Applications, March/April, 2002, and was used to convert low resolution images to high resolution images. The principles described herein present a data pruning method based on the example-based super-resolution technique. Under the presented framework, at the transmitter side, high-res patches are grouped and representative high-res patches are extracted from the input video. Representative high-res patches are then packed into a sequence of synthetic frames (patch frames). The resolution of the original video is then reduced and sent to the receiver along with the patch frames. At the receiver side, high-res patches are retrieved from the patch frames to create a patch library. The low-res patches in the received and upsized video are replaced with the high-res patches in the patch library by searching the corresponding high-res patches in the library using the low-res patches as keywords.

In order to apply the example-based super-resolution method to data pruning, several additional issues have to be addressed, including patch extraction, clustering, packing patches into frames and robust recovery. Compared to the existing approaches for data pruning as mentioned above, the present method has a number of advantages. First, the input video is simply resized to a smaller size uniformly for all frames in a video, therefore there is no artificial motion problem as in either the adaptive line or block removal approaches. Second, the high-resolution information is preserved by sending representative patches in patch frames, therefore the information loss problem is substantially alleviated. Third, there is little or no need to send additional metadata, such as line/block positions or surjective maps, through side channels.

The principles presented herein provide a method for pruning the input video data before it is encoded and transmitted, and recovering the pruned video data after it is decoded. The purpose of data pruning is to increase coding efficiency or meet a pre-specified video bit-rate requirement.

Figure 1B:
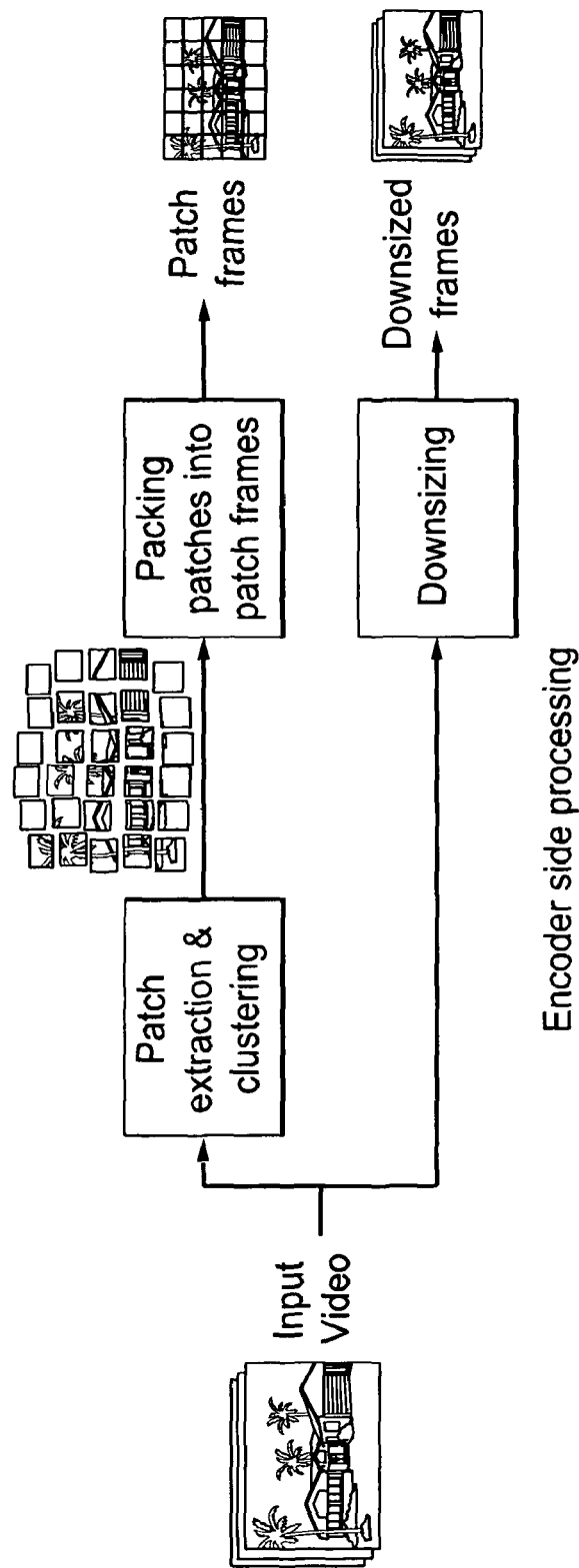
Figure 1C:
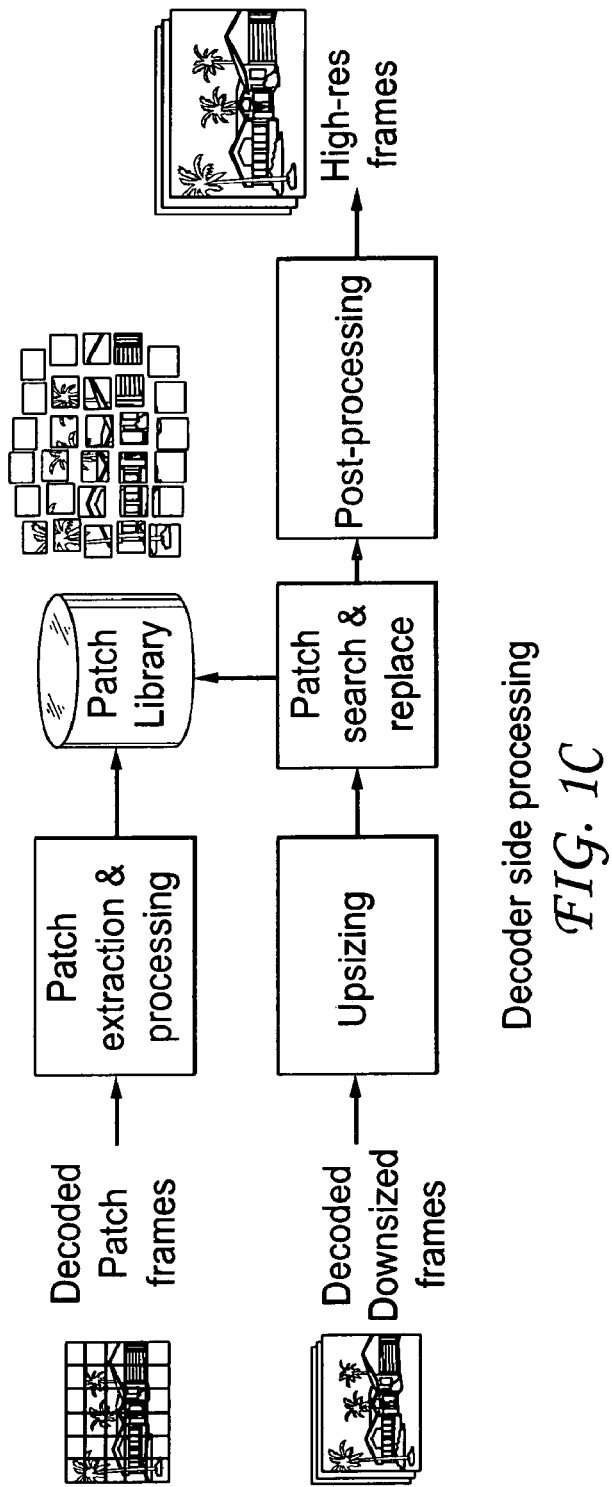

One embodiment of the present system is illustrated in FIG. 1. At the encoder side, patches are extracted from the input video and grouped together using clustering algorithms. The representative patches are selected and packed into patch frames. On the other path, the original video is downsized to a certain size according to the application requirement. The patch frames then can be sent to the decoder by attaching them to the regular downsized frames or sent as a separate video.

At the decoder side, the patches are extracted from the patch frames, and processed to optimize the search-and-replace process. The process then creates a patch library for the purpose of search and replacement. The decoded regular frames are first upsized to the original size using upsampling and interpolation (e.g. bicubic interpolation). The low-res patches in the upsized frames are replaced by the patches in the patch library by searching the corresponding high-res patches using the patches in the decoded regular frames as keywords. If the high-res patches cannot be precisely located in the library, the patches in the upsized frame would not be replaced. Finally, a post-processing procedure is performed to enhance spatiotemporal smoothness of the recovered video. The post-processing procedure can be also integrated into the search-and-replacement process using an optimization-based method.

1. Patch Extraction and Clustering

Patch extraction is realized by dividing the video frames into a set of blocks. In one embodiment of the present principles, the patches are defined as square blocks, such as 16×16 or 8×8 pixel blocks. Each patch is represented as a patch vector by converting, or flattening, the corresponding block image (which can be in different formats, such as RGB or YUV) into a vector. Therefore, the block image corresponding to a patch vector can be recovered by reshaping the patch vector into a matrix. Besides flattening the block images, patch vectors can be also extracted by extracting features (e.g. color histogram) from the block images. Patches are extracted from a sequence of frames. For long videos, the video should be divided into group of pictures (GOP). The clustering algorithm can be run within each GOP.

The purpose of patch clustering is to group together the patches that look the same or having similar visual properties. Only the representative patches of the clusters are packed into patch frames, so that the redundancy among patches within clusters can be removed. In one embodiment, the representative patch of each cluster is the mean of the patches in the cluster. The inputs of the clustering algorithm are the patch vectors extracted by flattening block images or by feature extraction (block image flattering is used in the current example embodiment).

1.1 Patch Clustering Algorithm

Many existing clustering algorithms, such as the k-means algorithm (also referred to as Lloyd's algorithm), hierarchical clustering algorithm, may be used for patch clustering. The requirement of our patch clustering algorithm is that the appearance variation of the patches within a cluster should not be too large. However, regular clustering algorithms, such as the k-means algorithm, cannot guarantee such requirement. Therefore, in the current embodiment, we use a modified k-means algorithm that strictly enforces the above requirement.

The regular k-means algorithm iterates between the following two steps until convergence:

1. For each data point, find the closest cluster in terms of the distance between the data point to the cluster center. The data point then is assigned to the closest cluster.
2. After all of the data points are assigned, the center of each cluster is updated by re-calculating the mean of the data points assigned to the cluster.

Our modified k-means algorithm is similar but includes an outlier rejection process:

1. For each data point, find the closest cluster in terms of the distance between the data point to the cluster center. If the distance is larger than a specified threshold $\beta$, then the data point is rejected, otherwise the data point is assigned to the cluster.
2. After all of the data points are assigned, the center of each cluster is updated by re-calculating the mean of the data points assigned to the cluster.

The modified k-means algorithm guarantees that the distance between any data point in a cluster to the center of the cluster is always smaller than the specified threshold $\beta$. The threshold $\beta$ can be determined empirically by looking at the clustering results and manually adjusting the value.

Another problem with the conventional k-means algorithm is that the cluster number k has to be determined a priori. In the present system, we require that all data points be covered by a minimum number of clusters, therefore k is unknown before the clustering process. To solve this problem, our clustering algorithm starts from one cluster, runs the modified k-means algorithm until convergence, and adds another cluster, repeating the process until all data points are assigned to one of the clusters. The center of each added new cluster is initialized with one of the (randomly selected) data points that are not assigned to any existing cluster.

Figure 2:
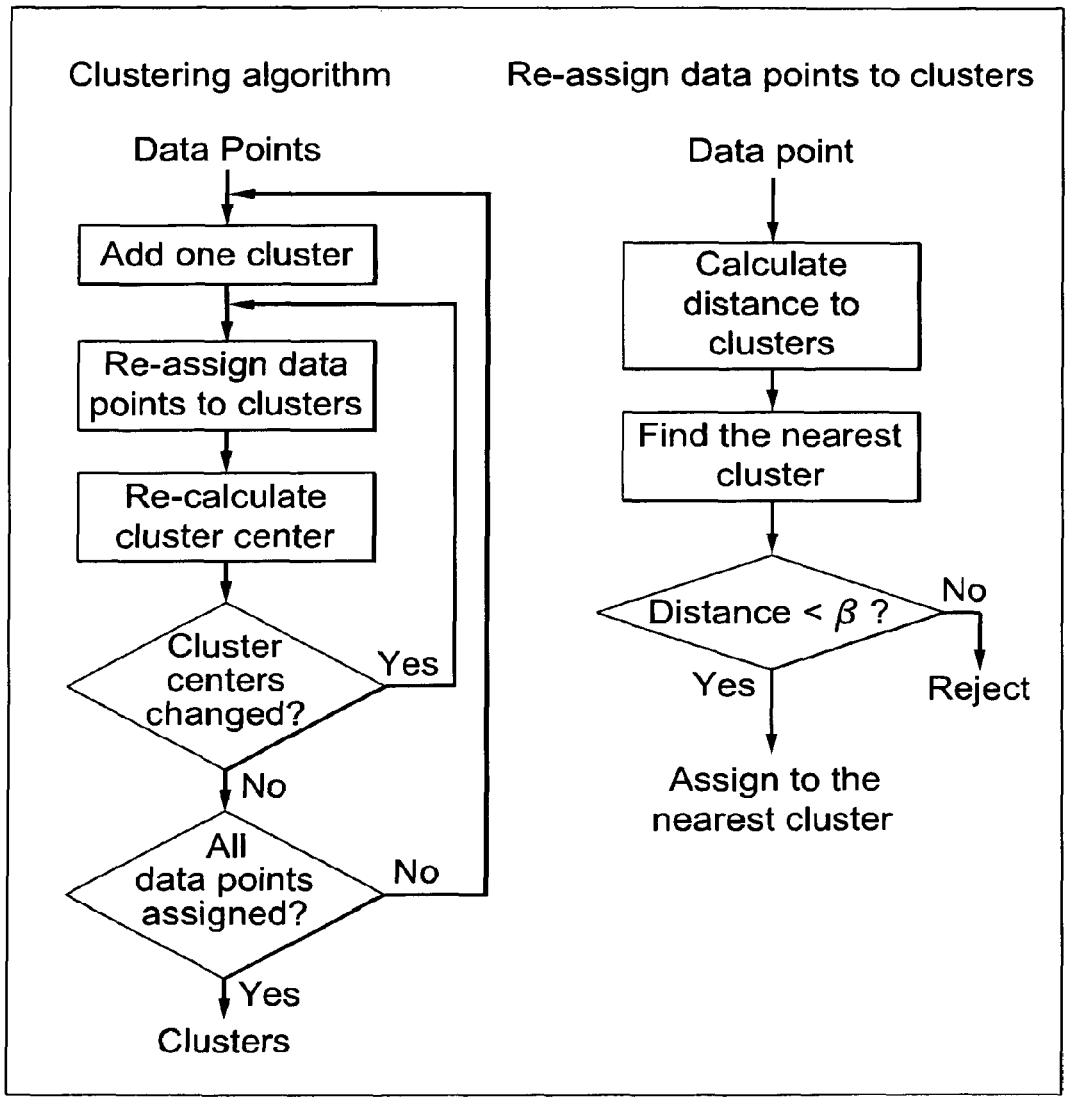
FIG. 2 shows a Patch Clustering Algorithm using the present principles.

The overall clustering algorithm is illustrated in the flowchart in FIG. 2.

1.2 More Efficient Patch Clustering

Because the clustering process adds one cluster at a time, and for each the modified k-means algorithm has to be run again, the clustering process tends to be slow. To speed up the clustering process, we developed two schemes. The first scheme is two-level clustering, the second is incremental clustering.

Figure 3:
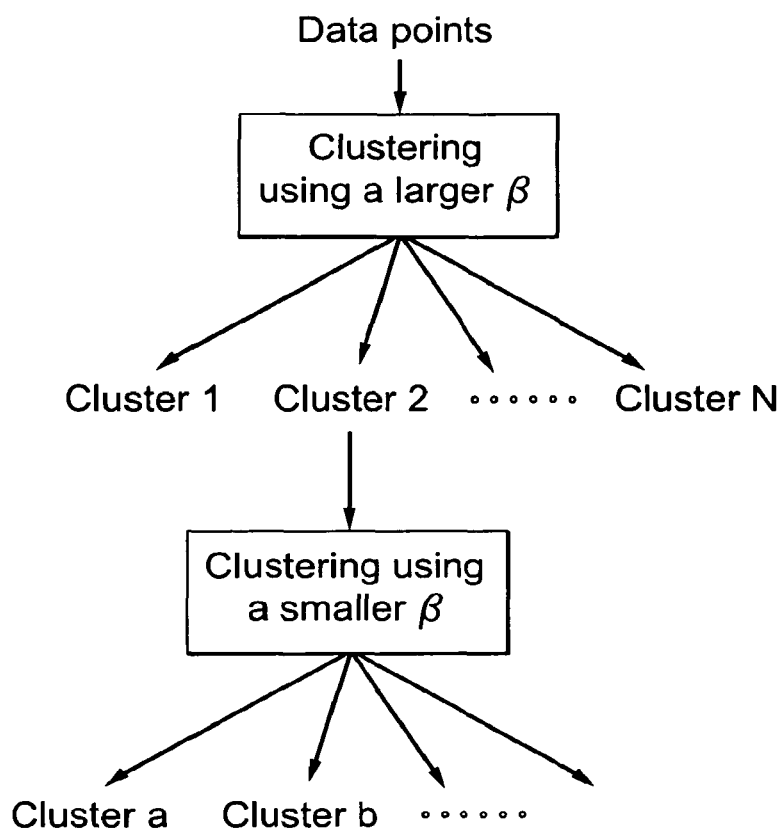
FIG. 3 shows a Two-level Clustering Algorithm using the present principles.

The two-level clustering process (FIG. 3) first runs the clustering process using a larger threshold $\delta$. After the clustering process is completed, a smaller threshold is used to run the clustering algorithm within each cluster that resulted from the first clustering process. A hierarchical clustering scheme such as this significantly increases the speed, but the trade-off is less accurate clustering results.

The incremental clustering scheme runs the two-level clustering process only for the first frame. For the subsequent frames, the clustering process will re-use the clusters and initialize the clustering process in each frame with the cluster centers inherited from the previous frames. The rest of the process is the same as the basic clustering algorithm illustrated in FIG. 2. After the clustering process for each frame is completed, the patches of that frame will be discarded to save memory space. And, the clustering process only retains the cluster centers and the number of data points in the clusters. To update a cluster, if M data points are assigned to the cluster, the cluster center is updated using the following equation:

$$C_i^+ = \frac{N_i C_i + \sum_{j=1}^{M} D_j}{N_i + M} \quad (1)$$

Where $C_i$ is the ith cluster center before update, $C_i^+$ is the updated cluster center, and $D_j$ are the data points (patch vector) assigned to the cluster. $N_i$ is the number of data points within the cluster before an update.

The advantage of incremental clustering is its ability to save both computation time and memory space during the clustering process. For a long video, the use of non-incremental clustering could result in prohibitive computation and storage requirements.

1.3 Group of Pictures

More patches would result in more clusters. If the number of patches is too large, the computation would become too slow to be practical. Therefore, for a long video, we need to divide the video into Groups of Pictures (GOPs), with the clustering algorithm only running in each GOP. The number of frames in a GOP can be variable or fixed. One approach for the flexible GOP is to use a shot detection algorithm to cut a video into a set of shots, and then each shot can be taken as a GOP.

After the GOP length is determined, the patch frames would be concatenated to each GOP. If the GOP length or the number of patch frames is variable, the metadata (e.g. binary flag) has to be sent using a side channel to indicate whether or not a frame is a regular frame or a patch frame.

1.4 Cluster Selection

The cluster selection process is performed to discard some of the clusters to be sent to the decoder side, because not all clusters are needed for decoder side processing. For example, if the cluster only contains patches of little detail, the cluster may not be needed, because the high-res version and low-res version of the flat patches are almost the same.

In one exemplary embodiment, all clusters are retained. That is because although flat patches contain no additional information, discarding flat patches may result in some of the flat patches being attracted to other clusters during the search-and-replace process, resulting in visible artifacts. Therefore, keeping the flat patch clusters as "dummy clusters" is beneficial for artifact reduction.

2. Packing Patches into Patch Frames

After the clustering process is completed within a GOP, the cluster centers are obtained as the representative patches for each cluster. The representative patches are then packed into patch frames. The patch frames and the regular downsized frames will be concatenated together and sent to the decoder side.

2.1 Making Patch Frames

In one exemplary embodiment, the patches are first packed into frames having the same size as video frames in the original video sequence. Afterwards, the large patch frames are divided into frames having the same size as the downsized video. This can be achieved in different ways. One way is just to divide the frames into blocks. The other way is to use a staggering sampling process, so that after size reduction, the frames look like the downsized regular video. The benefit of doing this is higher coding efficiency, because the sampled frames may look similar to the concatenated regular frames, and spatiotemporal smoothness is preserved.

Figure 4:
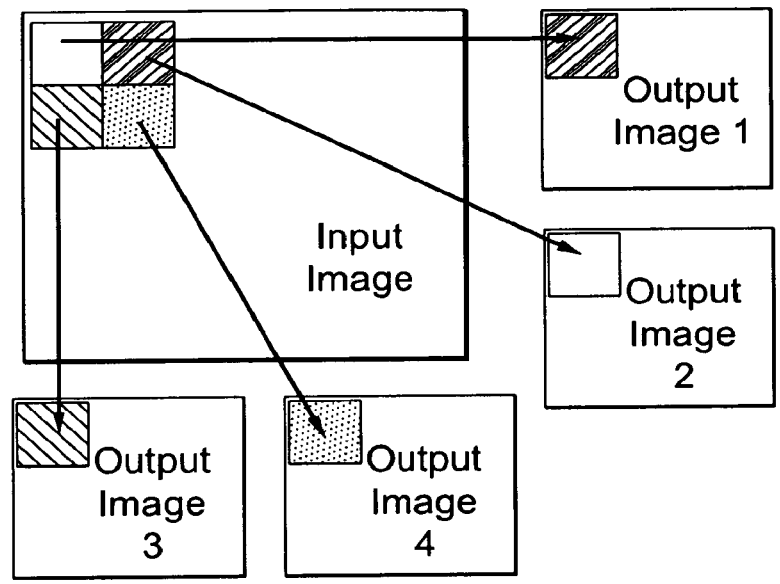
FIG. 4 shows a Staggering Sampling Process.

The staggering sampling process samples an image into multiple images by copying samples of the input image at different locations to the output images. For example, if downsampling by two, the pixels at the coordinates (1,1), (1,3),(3,1) . . . would be copied to the first output image; the pixels at the coordinates (1,2),(1,4),(3,2) . . . would be copied to the second output image, and so on (illustrated in FIG. 4). It should be noted that staggering sampling can be also performed with blocks as basic units besides pixels.

2.2 Optimizing the Positions of Patches

The patches can be packed into a frame in many different ways. However, the patches should be packed in such a way that the patch frames can be efficiently compressed by the encoder. This requires that patch frames be spatially and temporally smooth. It is possible to define a total cost function that accommodates the spatial and temporal smoothness of the patch frames. But optimizing such a cost function is very difficult, because the input space of the cost function is the total permutation of the patches.

Therefore, the present system uses a different approach. The rationale behind the approach of the present system is that all patches should be kept in the same positions that they originated. This will ensure that the patch frames resemble the original frames and so that the spatial structures of the original frames are preserved. To achieve this, during the clustering process, the frame IDs and positions of the patches within each cluster are retained. This information will be used during the patch packing process.

Figure 5:
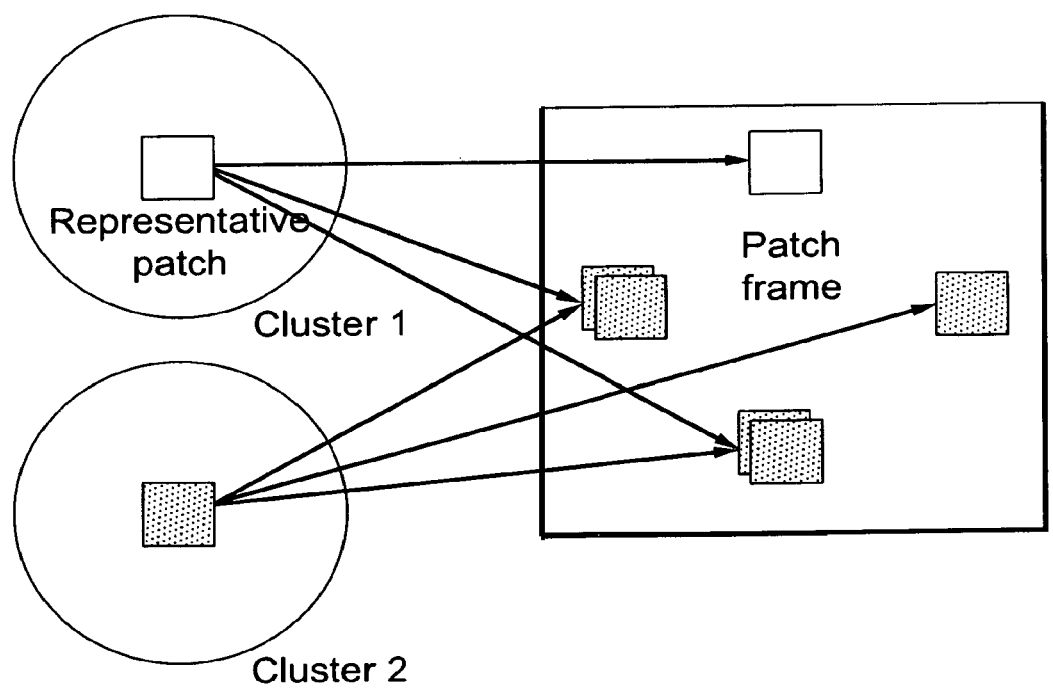
FIG. 5 shows Patch Position Optimization and Distributing Patches.
Figure 6:
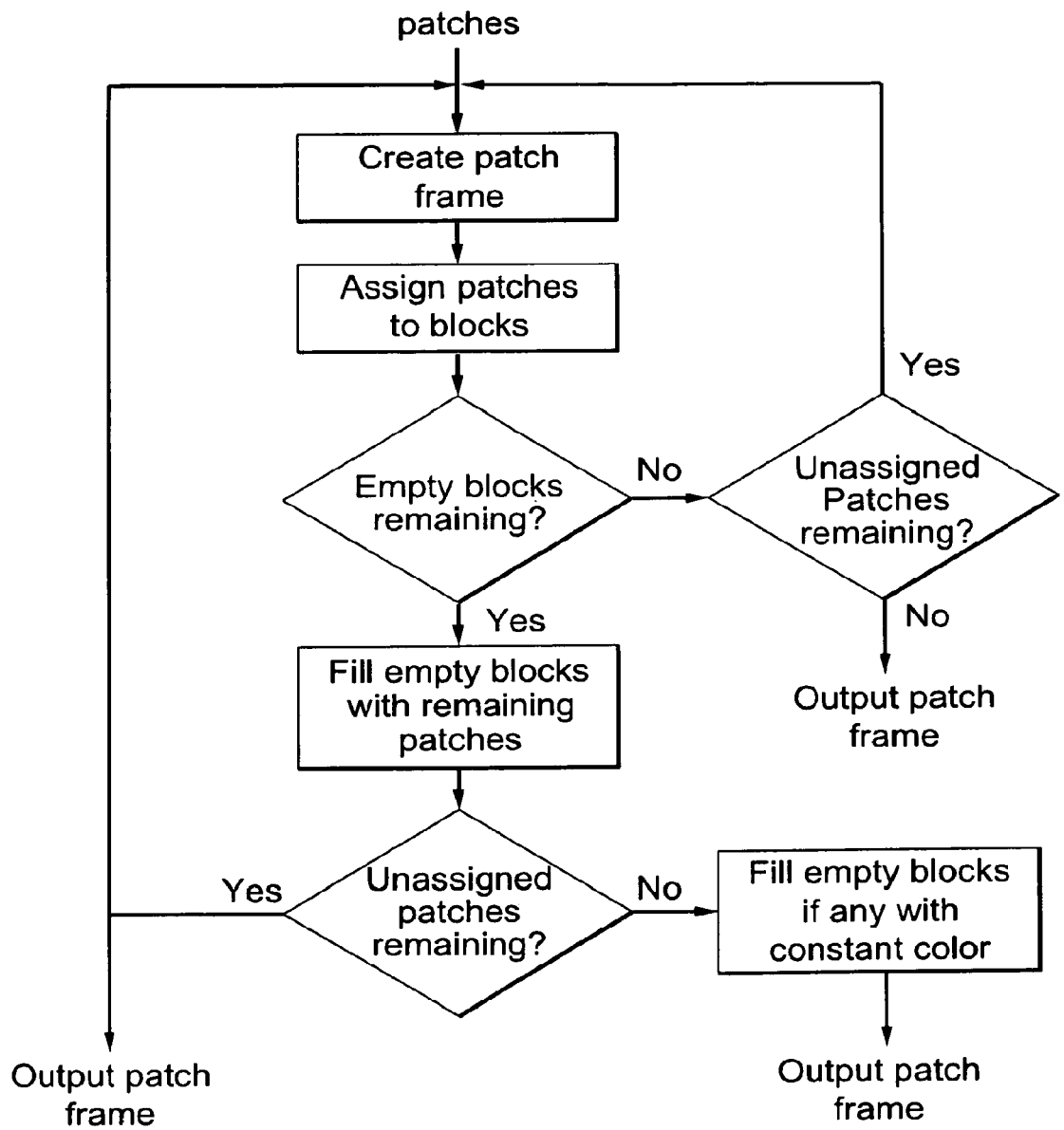
FIG. 6 shows one example of Packing Patches into Patch Frames under the present principles.

After the clustering process is done, each cluster is attached with the position information of all the patches within the cluster. The representative patch of a cluster is then distributed to the corresponding positions in the patch frame. For example, if a cluster contains two patches tagged with coordinate (1,2),(2,2), then the representative patch of the cluster would be assigned to the (1,2) and (2,2) block in the patch frame. The process is illustrated in FIG. 5. As a result, each block of the patch frame could be assigned with multiple candidate patches (each patch represents a cluster). The optimization process will select one patch from the candidate patches according to certain criteria (e.g., spatial smoothness). In one exemplary embodiment, for each block position in the patch frame, we select the first patch that has not been assigned to any block position among the patch candidates. After the assignment, however, some of the block positions may be still empty, and some of the patches are not yet assigned. The unassigned patches then will be assigned to the empty blocks according to a metric representing the patches' compatibility with the neighboring blocks that have already been assigned with patches. The compatibility metric is defined by the average distance between the patch with their neighboring blocks. The fill-in process will select an empty block that has the best comparability metric with its neighboring blocks. If empty blocks in the patch frame are not fully filled, the blocks will be filled with a constant color, which, in one embodiment, is the average color of the neighboring blocks. If all the empty blocks are filled, and there remain unassigned patches, another patch frame is created and the same process is repeated to accommodate the unassigned patches. The process is illustrated in FIG. 6. The method of data pruning just described can be used independently or in conjunction with other video coding techniques.

3. Patch Extraction and Processing from Patch Frames

After the patch frames are received at the decoder side, the high-res patches in the patch frames will be extracted by block division. This is done in addition to any decoding that must be performed if the data has been coded with any other coding methods prior to transmission. The extracted patches are used to create a search table (i.e. patch library) and are tagged with "flat patch" or "non-flat patch" labels, or flags.

The search table is created by reducing the sizes of the high-res patches to smaller patches. The resizing ratio is equal to the resizing ratio of the video frame. The downsized patches are taken as the "keywords" of the high-res patches for the search-and-replacement process.

The tagging process is conducted to mark patches as "flat patch" or "non-flat patch". Flat patches are the patches having little or no high-frequency details. The search-and-replacement process will skip the flat patches for replacement. Flat patches are useful for reducing visual artifacts. If such a mechanism is not used, the patches containing little details in the image for recovery may be attracted to other patches in the patch library, therefore probably leading to wrong patch replacement and visual artifacts. The "flat patch" classification is implemented by first resizing the small "keyword" patch to the same size as the high-res patch through upsampling and interpolation (e.g., bicubic interpolation). Afterwards, the distance between the resized patch and the high-res patch is calculated. If the distance is smaller than a predefined threshold, the high-res patch is marked as "flat patch".

4. Patch Search and Replacement

After the patch search table is created, patch search-and-replacement process will be carried out to convert the low-res input frame to a high-res frame.

Figure 7:
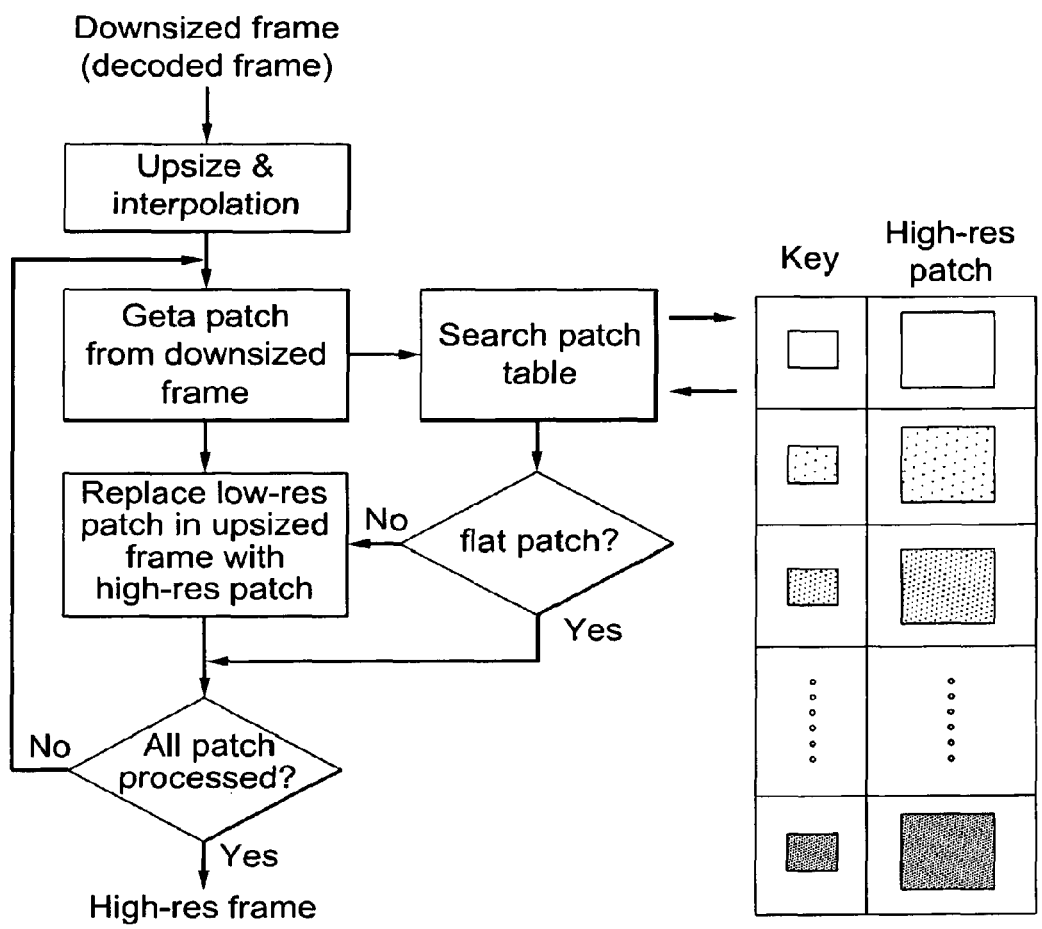
FIG. 7 shows one embodiment of the Search-and-Replacement Process under the present principles.

The downsized input frame would be first upsampled and interpolated (e.g., using bicubic interpolation). Then the search-and-replacement process is conducted from one block to another. During the search-and-replacement process, the corresponding blocks in the downsized input frame can be used as query patches instead of the blocks in the upsized frame, because the upsized version is distorted by the upsampling and interpolation process, and using the smaller patches for searching is somewhat more efficient. The search process can be implemented as a linear search procedure, but a more sophisticated, faster search algorithm (e.g., binary tree search) may also be used. After the nearest keyword patch in the search table is found, the algorithm will look at the "flat patch" tag of the patch. If the patch in the table is a "flat patch", the corresponding low-res patch in the upsized frame will be kept intact; otherwise the low-res patch will be replaced by the high-res patch corresponding to the identified keyword patch. The process is illustrated in FIG. 7.

5. Improving the Search-and-Replacement Process

One problem of the search-and-replacement process is that it does not take into account spatial and temporal smoothness. As a result, visible artifacts are possible if the patches in the low-res frame are replaced with wrong patches in the patch table. One approach to solving the problem is to use post-processing. One approach is to let the system detect potential patch replacement errors and smooth them to make them consistent with their neighboring patches. But it is difficult to achieve accurate detection of the patch replacement errors, and smoothing may result in blurred video frame.

Another approach is to use a method similar to that used in the prior art, where the search-and-replacement process is formulated as a cost function minimization problem that takes into account spatiotemporal smoothness.

Assuming that there are N patches in the search table and M patches in the low-res frame that need to be replaced with high-res patches, at each block position in the low-res frame there are N choices of patch replacement. Consequently, the cost function can be defined as the following:

$$\text{Cost}(P_1, P_2, \ldots, P_M) = \sum_{i=1}^{M} C1(P_i) + \lambda \sum_{i,j} C2(P_i, P_j) \quad (2)$$

where $P_i$ is the choice of patch in the patch table, which ranges from 1 to N. $\lambda$ is a weighting factor. C1 is the cost function measuring the distance between the query patch and the keyword patch corresponding to $P_i$ in the patch table. For example, if the downsized patch corresponding to the low-res patch to be replaced is $I_i$, and the keyword patch in the patch table corresponding to the index $P_i$ is $G_{P_i}$, then we can define $C1(P_i)=\|I_i-G_{P_i}\|^2$. C2 is the cost function measuring the smoothness of the neighboring patches, which may be defined as $C2(P_i, P_j)=\|G_{P_i}-G_{P_j}\|^2$. C2 can be pre-calculated and saved as an N×N matrix.

The above formulation only accommodates spatial smoothness. Temporal smoothness can be easily incorporated by adding another term, such as $$\text{Cost}(P_1, P_2, \ldots, P_M) = \sum_{i=1}^{M} C1(P_i) + \lambda \sum_{i,j} C2(P_i, P_j) + \mu \sum_{i=1}^{M} C3(P_i)$$

where C3 is a cost function for enforcing temporal consistency $$C3(P_i)=\|J_i-G_{P_i}\|^2 \quad (3)$$

and where $J_i$ is a patch in the previous frame that corresponds to the patch $I_i$ in the current frame. If motion is not considered, is just the patch in the previous frame at the same location of $I_i$. If motion is considered, and the motion estimation algorithm shows that the kth patch in the previous frame should correspond to $I_i$, then $J_i$ should be changed to $J_k$. $\mu$ is another weighting factor to balance the keyword match cost and temporal smoothness cost.

Solving the form of the optimization as in Eq. (2) is a standard problem in computer vision. And it can be solved by different methods, for instance, the Belief Propagation algorithm, Graph Cuts algorithm, or Monte Carlo simulation.

Figure 8:
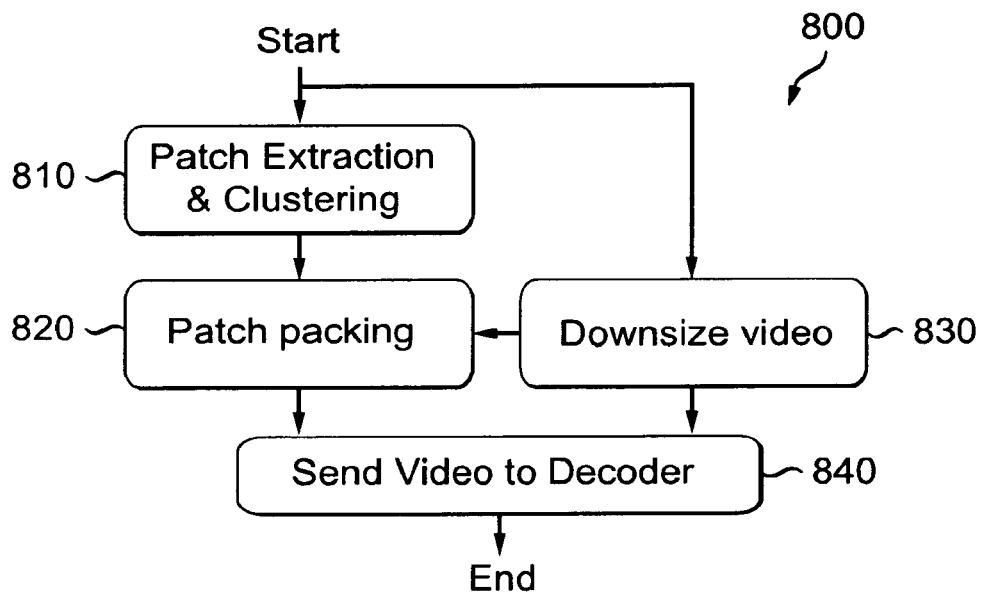
FIG. 8 shows one embodiment of an encoding method using the present principles.

FIG. 8 shows one embodiment of a method 800 for video coding using data pruning for video compression. A video sequence is input to the process, which begins with patch extraction and clustering in step 810. In parallel, the video is downsized in step 830. The patches which were extracted from the video in step 810 are packed into patch frames in step 820. The patch frames and the downsized regular frames of video may be sent to a decoder separately, or combined in step 840.

Figure 9:
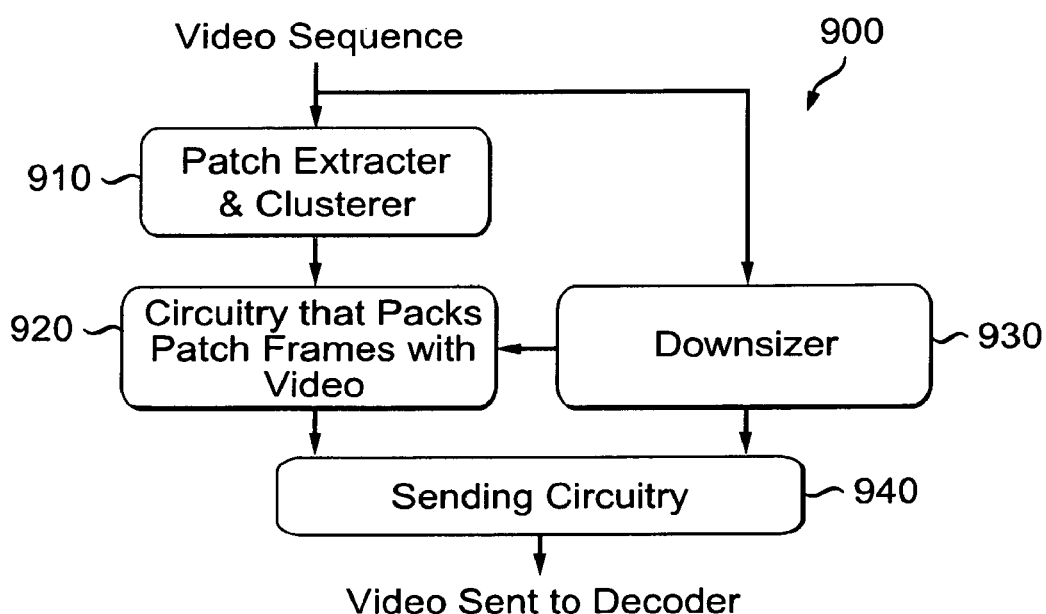
FIG. 9 shows one embodiment of an encoding apparatus using the present principles.

FIG. 9 shows one embodiment of an apparatus 900 for video coding using data pruning for video compression. A video sequence is input to a Patch Extracter and Clusterer 910 that extracts patches from the video and groups them into clusters. The output of Patch Extracter and Clusterer 910 is in signal communication with the input of Circuitry that Packs Patch Frames with Video 920, which finds representative patches that are packed into patch frames. The input video sequence is also input to Downsizer 930 to generate smaller frames. The output of Circuitry that Packs Patch Frames with Video 920 is input to Sending Circuitry 940, which also receives an input from the output of Downsizer 930.

Figure 10:
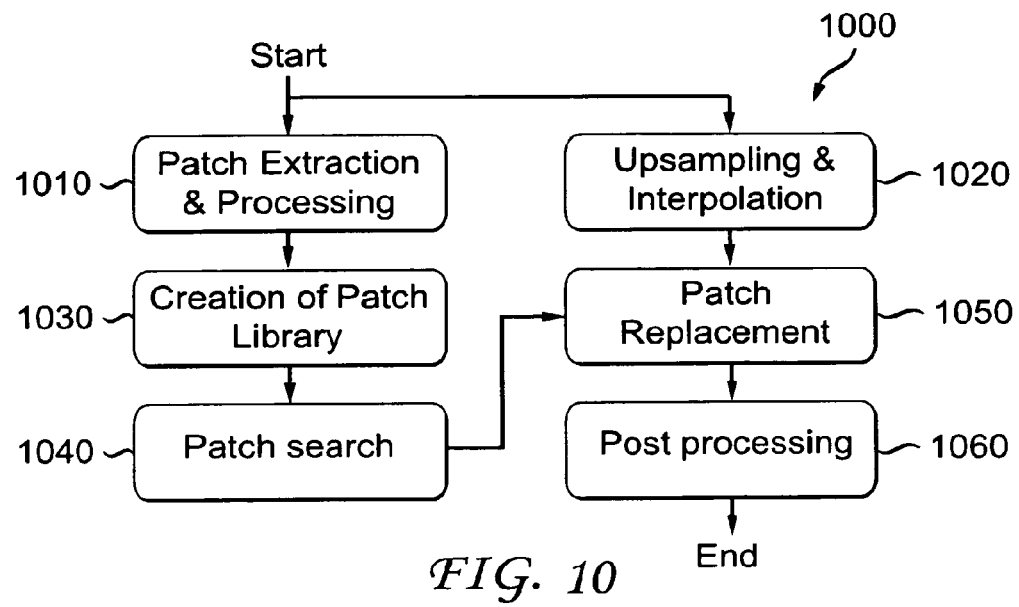
FIG. 10 shows one embodiment of a decoding method using the present principles.

FIG. 10 shows one embodiment of a method 1000 for decoding video. The method begins with Patch Extraction and Processing, in which patches are extracted from received video in Step 1010. The received video is comprised of regular video frames and patch frames. In parallel with Step 1010, the input regular video is upsampled and interpolated in Step 1020. After the patches have been extracted in Step 1010, they are organized into a Patch Library in Step 1030. The library is searched, in Step 1040, using portions of video, called keywords, from the regular frames of video prior to upsampling, that is, the low-res portions. The keywords act as indices or addresses into the patch library. Patch replacement is performed in Step 1050, in which the patches found during the search in Step 1040 are used to replace their corresponding video patches from the upsampled regular video frames. Next, post processing is performed in Step 1060 to enhance spatiotemporal smoothness of the recovered video.

Figure 11:
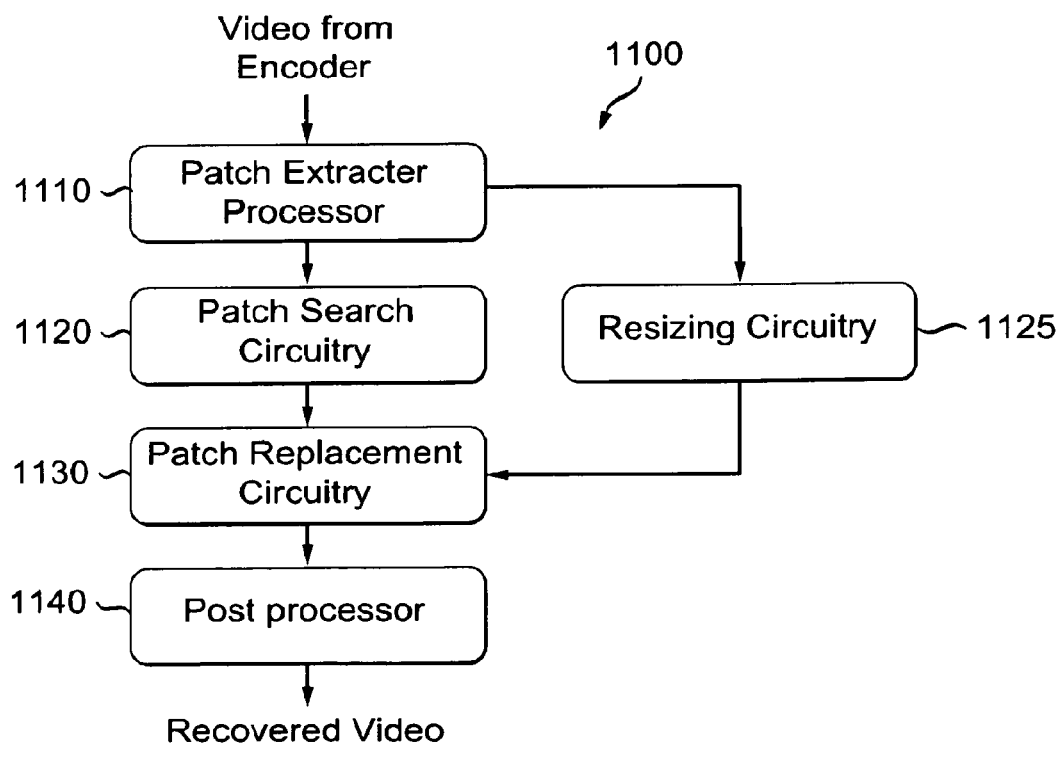
FIG. 11 shows one embodiment of a decoding apparatus using the present principles.

FIG. 11 shows one embodiment of an apparatus 1100 for decoding video. The apparatus is comprised of a Patch Extracter Processor 1110 for extracting patches from a received video signal and creating a patch library. The input video from an encoder is also sent to the input of Resizing Circuitry 1125 that upsamples and interpolates the regular frames of video received as part of, or along with, the input video signal. The output of Patch Extracter Processor 1110 is in signal communication with the input of Patch Search Circuitry 1120, which uses portions of video, called keywords, from the regular frames of video prior to upsampling, to search the patch library for suitable replacement patches. The output of Patch Search Circuitry 1120 is in signal communication with a first input of Patch Replacement Circuitry 1130, which also receives as a second input, the output of Resizing Circuitry 1125. Patch Replacement Circuitry 1130 replaces low resolution portions of video in the upsampled regular frames of video with patches from the patch library, found by Patch Search Circuitry 1120. The output of Patch Replacement Circuitry 1130 is in signal communication with the input of Post Processor 1140, which enhances the spatiotemporal smoothness of the recovered video.

We thus provide one or more implementations having particular features and aspects. However, features and aspects of described implementations may also be adapted for other implementations.

For example, these implementations and features may be used in the context of coding video and/or coding other types of data. Additionally, these implementations and features may be used in the context of, or adapted for use in the context of, a standard. Several such standards are AVC, the extension of AVC for multi-view coding (MVC), the extension of AVC for scalable video coding (SVC), and the proposed MPEG/JVT standards for 3-D Video coding (3DV) and for High-Performance Video Coding (HVC), but other standards (existing or future) may be used. Of course, the implementations and features need not be used in a standard.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A description will now be given of the many attendant advantages and features of the present principles, some of which have been mentioned above. For example, one advantage of the present principles is that input video is uniformly resized to a smaller size for all frames, and so no artificial motion artifacts are introduced.

Another advantage is that the high resolution information is preserved by sending representative patches in the patch frames, therefore, minimizing information loss.

Yet another advantage is that there is no need to send additional metadata, such as line or block positions or surjective maps, through side channels under the present principles.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

The invention claimed is:
1. A method of video processing, comprising:
  extracting patches of video from a received video signal;
  clustering the patches into groups, wherein clustering is performed by:
    finding a cluster having a minimum distance between each data point and a cluster center;

comparing said minimum distance to a threshold, and if larger than the threshold the data point is rejected, otherwise the data point is assigned to the cluster; and re-calculating a mean of the data points assigned to the cluster to determine an updated center of each cluster, after all data points are assigned, wherein frame identification and position of the patches within each cluster are retained;

downsizing the original video;

packing representative patches from the groups into patch frames at their corresponding positions;

assigning unassigned patches to empty blocks in the patch frames according to a metric based on neighboring blocks;

creating another patch frame if unassigned patches remain;

assigning a constant to additional empty blocks within a patch frame;

dividing patch frames by using a staggering sampling process; and transmitting the downsized original video with the divided patch frames to a decoder.

2. The method of claim 1, further comprising concatenating the data for the patch frames to the received video signal.

3. The method of claim 2, wherein the concatenating is performed by interspersing data of the regular frames with data of the patch frames.

4. The method of claim 1, wherein extracting is performed based on features of the video.

5. The method of claim 1, wherein clustering is performed based on a modified k-means algorithm.

6. The method of claim 1, wherein clustering is performed using incremental clustering.

7. The method of claim 1, wherein the patch frames are downsized by dividing them into blocks.

8. The method of claim 1, wherein the patch frames are downsized by using staggering sampling.

9. The method of claim 2, wherein the position of the patches in the patch frame is optimized for spatiotemporal smoothness.

10. The method of claim 2, wherein a flag is used to indicate whether a frame is a patch frame or a frame from the received video signal.

11. An apparatus for video processing, comprising:
one or more processors and a memory including computer program code and the computer program code configured to, with the at least one processor, cause the apparatus to:
extract patches of video from a received video signal and clustering the patches into groups, wherein clustering is performed by:
finding a cluster having a minimum distance between each data point and a cluster center;
comparing said minimum distance to a threshold, and if larger than the threshold the data point is rejected, otherwise the data point is assigned to the cluster; and
re-calculating a mean of the data points assigned to the cluster to determine an updated center of each cluster, after all data points are assigned, wherein frame identification and position of the patches within each cluster are retained;
downsize to reduce the size of the received video signal;
pack representative patches from the groups into patch frames at their corresponding positions and assigns unassigned patches to empty blocks in the patch frames according to a metric based on neighboring blocks while creating another patch frame if unassigned patches remain and assigning a constant to additional empty blocks within a patch frame and divides patch frames by using a staggering sampling process; and
transmit the divided patch frames and downsized video signal to a decoder.

12. The apparatus of claim 11, wherein the circuitry concatenates the data for the patch frames to the received video signal.

13. The method of claim 11, wherein the circuitry intersperses the data from the received video signal with data from patch frames.

14. The apparatus of claim 11, wherein the means for extracting patches of video and clustering the patches performs extracting based on features of the video.

15. The apparatus of claim 11, wherein the clusterer performs clustering based on a modified k-means algorithm.

16. The apparatus of claim 11, wherein the clusterer performs clustering using incremental clustering.

17. The apparatus of claim 11, wherein the circuitry downsizes patch frames by dividing them into blocks.

18. The apparatus of claim 11, wherein the patch frames are downsized by using staggering sampling.

19. The apparatus of claim 12, wherein the position of the patches in the patch frame is optimized for spatiotemporal smoothness.

20. The apparatus of claim 12, wherein a flag is used to indicate whether a frame is a patch frame or a frame from the received video signal.

21. A method of processing a video signal, comprising:
extracting patches of video from patch frames formed by a staggering sampling process, wherein said patch frames comprise representative patches at their corresponding positions in said video signal;
creating a patch library from extracted patches by reducing the size of high resolution patches to smaller patches, further comprising adding flags having two possible values to the extracted patches indicative of the level of high-frequency detail in a corresponding patch and wherein the flags are created by upsampling and interpolating a small size patch to a same size as a corresponding high resolution patch and comparing the distance between the resized patch and its corresponding original patch with a predefined threshold to determine whether the high resolution patch is marked as a flat-patch if said distance is smaller than the predefined threshold;
increasing the size of regular frames of video;
replacing low resolution portions of video in the increased size regular frames of video with patches searched from the patch library using the low resolution portions as keywords; and
performing post processing on the resulting video.

22. The method of claim 21, wherein extracting is performed on a block basis.

23. The method of claim 21, wherein the creating step further comprises adding flags to the extracted patches indicative of the level of high-frequency detail in a corresponding patch.

24. The method of claim 21, wherein creating a patch library further comprises reducing the sizes of the extracted patches.

25. The method of claim 23, wherein the flags are created by upsampling and interpolating a small size patch and comparing a distance between the resized patch and its corresponding original patch with a predefined threshold.

26. The method of claim 21, wherein the replacing step is performed on a block basis.

27. The method of claim 21, wherein searching in the replacing step is performed using a binary tree search.

28. The method of claim 23, wherein the flags are used by the replacing step to determine whether to replace a patch with one from the patch library.

29. The method of claim 21, wherein the replacing step is based on minimization of a cost function.

30. The method of claim 29, wherein the cost function is based on spatiotemporal smoothness.

31. An apparatus for processing a video signal, comprising:
one or more processors and a memory including computer program code and the computer program code configured to, with the at least one processor, cause the apparatus to:
extract patches of video from patch frames formed by a staggering sampling process, wherein said patch frames comprise representative patches at their corresponding positions in said video signal and creating a patch library from extracted patches by reducing the size of high resolution patches to smaller patches, further comprising adding flags having two possible values to the extracted patches indicative of the level of high-frequency detail in a corresponding patch and wherein the flags are created by upsampling and interpolating a small size patch to a same size as a corresponding high resolution patch and comparing the distance between the resized patch and its corresponding original patch with a predefined threshold to determine whether the high resolution patch is marked as a flat-patch if said distance is smaller than the predefined threshold;
resize to increase the size of regular frames of video;
search the patch library using low resolution portions of video in the regular frames of video as keywords;
replace low resolution portions of video in the increased size regular frames of video with the patches searched from the patch library;
and
perform post processing on video from the patch replacement circuitry.

32. The apparatus of claim 31, wherein the means is a patch extracter processor.

33. The apparatus of claim 31, wherein the patch extracter further comprises circuitry to add flags to the extracted patches indicative of the level of high-frequency detail in a corresponding patch.

34. The apparatus of claim 31, wherein the patch extracter further comprises circuitry to reduce the sizes of the extracted patches.

35. The apparatus of claim 33, wherein the patch extracter further comprises circuitry to create flags by upsampling and interpolating a small size patch and comparing a distance between the resized patch and its corresponding original patch with a predefined threshold.

36. The apparatus of claim 31, wherein the patch replacement circuitry operates on a block basis.

37. The apparatus of claim 31, wherein the patch search circuitry performs a binary tree search.

38. The apparatus of claim 33, wherein the patch replacement circuitry determines from the flags whether to replace a patch of low resolution video in the increased size regular frames of video with a patch from the patch library.

39. The apparatus of claim 31, wherein the patch replacement circuitry replaces patches by minimization of a cost function.

40. The apparatus of claim 39, wherein the cost function minimizes a cost function that measures spatiotemporal smoothness.

* * * * *